United States Patent [19]

Chalupa et al.

[11] 3,862,333

[45] Jan. 21, 1975

[54] METHODS AND COMPOSITIONS FOR INHIBITING RUMEN MICROBIAL DEAMINATION

[75] Inventors: William V. Chalupa, Malvern; Alfred W. Chow, Radnor; Roger C. Parish, King of Prussia, all of Pa.

[73] Assignee: Smithkline Corporation, Philadelphia, Pa.

[22] Filed: Mar. 27, 1974

[21] Appl. No.: 455,169

Related U.S. Application Data

[63] Continuation-in-part of Ser. No. 344,373, March 23, 1973, abandoned.

[52] U.S. Cl................ 424/353, 424/304, 424/317, 424/319, 424/324, 424/330, 424/337, 424/339
[51] Int. Cl............................................. A61k 27/00
[58] Field of Search........... 424/304, 317, 319, 324, 424/330, 337, 339, 353

[56] References Cited
OTHER PUBLICATIONS

Gershenfeld et al., – Chem. Abst., Vol. 43, (1949), pp. 268f & 269a.
Freedlander et al., – Chem. Abst., Vol. 41, (1947), p. 2115b.
Wallace – J. of Animal Science, Vol. 31, Dec. 1970, pp. 1118 to 1120.

Primary Examiner—Sam Rosen
Attorney, Agent, or Firm—William H. Edgerton

[57] ABSTRACT

Compositions and methods for inhibiting selectively microbial deamination in ruminant animals comprise administering orally a diphenyliodonium salt. Inhibition of microbial deamination enables the ruminant animal to utilize protein or amino acids more efficiently. Particularly useful as active ingredients are 4,4'-dimethyldiphenyliodonium salts.

18 Claims, No Drawings

METHODS AND COMPOSITIONS FOR INHIBITING RUMEN MICROBIAL DEAMINATION

This application is a continuation-in-part of copending Ser. No. 344,373, filed Mar. 23, 1973, now abandoned.

This invention relates to oral compositions containing as an active ingredient a diaryliodonium salt and methods for employing said ingredient useful for inhibiting microbial deamination of amino acids and protein in the rumen of ruminant animals thereby allowing the amino acid units to pass through the destructive milieu of the rumen and to be absorbed in the lower gut.

The rumen is a closed system of multiple biological reactions, some competing, some cooperating. Of the approximately 75% of the carbon content of ingested feed fermented by the rumen about 20% goes to formation of methane and carbon dioxide, 40% goes to the primary ruminant energy source, the volatile fatty acids, and 15% to microbial polysaccharides and proteins (amino acids). Some dietary proteinaceous material may normally pass through the rumen without being fermented. The rumen fermentation responsible for amino acid destruction involves various strict and facultative anaerobic bacteria and protozoa.

The importance of amino acids in the protein nutrition of ruminants is well recognized. The concept that shortages of one or more amino acids limits productivity in cattle and sheep is indicated by nitrogen balance, wool growth, and lactation responses obtained by postruminal administration of amino acids and proteins. The mixture of amino acids available for gastrointestinal absorption, is supplied by microbial protein synthesized in the rumen and food proteins which survive degradation by the rumen microbes. Not all dietary protein is degraded in the rumen. The amount of degradation in the rumen is dependent upon the solubility of the protein (Chalupa, J. Nutr. 83,77 (1964)). Many attempts have been made to improve ruminant animal performance by the addition of free amino acids to the diet. In general, it has been concluded that such additions do not improve ruminant animal performance (Oltjen, J. Animal Sci., 28,673 (1969)). Free amino acids are readily degraded by the rumen microbes.

Some of the most important protein sources are relatively susceptible to degradation by rumen microbes. These include soybean meal, linseed meal, soy protein and casein and others. If it were possible to protect free amino acids or proteins from rumen microbial degradation and bypass them to the lower digestive tract, this should lead to an improvement in animal performance. Chalmers et al. (J. Agric. Sci., 44,254 (1954)) showed that abomasal infusion of casein to pregnant ewes gave improved nitrogen retention over ruminally infused casein. Reis and Schinckel (Austral. J. Agric. Res., 12,335 (1961)) observed similar results in sheep with abomasally infused versus dietary casein. They later observed that abomasal infusion of casein, L - cysteine or DL - methionine produced dramatic responses in wool growth (Reis and Schinckel, Austral. J. Biol. Sci., 16,218 (1963); 17,532 (1964)). Little and Mitchell (J. Animal Sci. 26,411 (1967)) observed higher nitrogen retention in sheep when soybean protein was given abomassaly compared to orally. Reis (Austral. J. Biol. Sci., 20,809 (1967)) observed increased wool growth with abomasal adminstration of L-cysteine, DL-methionine or methionine hydroxy analog. Devlin and Woods (J. Animal Sci. 24,878 (1965)) observed a nitrogen retention response with steers with abomasally infused lysine.

It is apparent that to inhibit the microorganisms which deaminate amino acids in a useful manner, a selective inhibition of the fermentation must take place. Random or overall inhibition of rumen fermentation will cause side effects in the animal such as lower cellulose digestion, decreased lactic acid utilization or decreased appetite. These effects would render any protection of amino acid useless, since the overall efficiency of the digestive purpose of the rumen would be affected. The production of volatile fatty acids must also be maintained without any substantial reduction.

The animals in which inhibition of microbial deamination would be of particular value are growing and fattening beef cattle in order to increase productivity, daily weight gain and feed efficiency as well as the supply of animal protein. For example, a diet useful for feed-lot heiffers might be supplemented by urea, an oil seed meal, such as is exemplified hereafter, or alfalfa as a high protein supply, and a microbial deaminase inhibitor. The compositions and methods of this invention may be used also in sheep such as in feeder lambs for increasing weight gain and feed efficiency or in mature lambs for improving wool production. Finally, in dairy cattle, use of this invention might be found in increased milk protein production or increased milk production; however, this use has not yet been realized to a highly reproducable result.

In the past, attempts have been made to add essential amino acids to the diet in a coated condition or to protect dietary protein sources (i.e. casein, soy protein) by chemical reaction of the proteins with formaldehyde or tannin. Both procedures act to take the amino acid through the rumen and then release the active ingredient chemically or by digestive action in the small intestine for absorption. Of course, this does not protect the amino acids in the normal diet. Reference may be had to U.S. Pat. No. 3,655,864.

We have now found that certain iodine (III) compounds having two carbon-iodine bonds on the same iodine atom, especially diaryl iodonium salts, inhibit rumen deamination of dietary or supplemental amino acids without having a toxic effect or an overall inhibition of rumen fermentation.

The active ingredients of this invention are a class of compounds known to the art, the diaryl iodonium salts. These compounds have been known to have an antibacterial action against certain aerobic microorganisms and have been used as external antimicrobial agents such as in soaps, bandages and the like. See, for exmaple, U.S. Pat. Nos. 3,244,636; 3,264,355; 3,591,679; 3,422,152; 3,506,719; B.E. 773,179; B.E. 1,018,454; Freedlander et al., Proc. Soc. Exptl. Biol. Med. 63 319 (1946); Gershenfeld et al., Am. J. Pharmacy 120 158 (1948); 121 343 (1949); Engelhard et al., J. Am. Pharm. Assoc. 45 402 (1956); C.A., 50 1251 and others. While the selective inhibition of rumenal deamination extends qualitatively over a broad range of diaryl iodonium compounds, the active ingredients of the following structural formula are exemplary:

Formula I

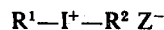

in which:

$R^1$ and $R^2$ are phenyl, naphthyl, furyl, thienyl or pyridyl optionally substituted by one or more trivial substituents known to the art such as lower alkyl of from 1–10 carbon atoms, cycloalkyl of 3–6 carbon atoms, phenyl, halo, trifluoromethyl, hydroxy, lower alkoxy of 1–10 carbon atoms, phenyloxy, acetamido, acetyl, benzoyl, allyl, benzyl, benzyloxy, amino, nitro, carbonyl, carboxy, sulfonamido, sulfamyl, sulfo, thio, carbalkoxy of 1–10 carbon atoms or cyano; and Z is an inorganic or organic anion derived from a nontoxic, pharmaceutically-acceptable acid such as chloride, bromide, phosphate, iodide, hydroxide, sulfate, bisulfate, edisylate, nitrate, benzenesulfonate, methanesulfonate, tosylate, acetate, haloacetate, halosulfonate, proponate, benzoate, fumarate, maleate, lactate, citrate or tartrate. Alternatively, the anionic charge might be compensated internally such as by a carboxy or sulfo substituent on the aryl moieties.

Optionally, the aryl groups $R^1$ and $R^2$ when phenyl may be joined by a $2,2^1$-bridge in which the bridge is a $(CH_2)_p$ in which $p$ is an integer of from 0–3, sulfur or oxygen.

A most useful group of compounds are represented by Formula II:

Formula II

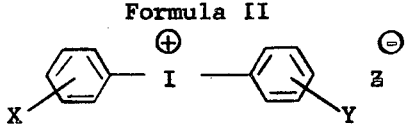

in which:

Z is an optional anion as described above and X and Y are one or more, but preferably one, hydrogen, methyl, ethyl, halo such as bromo, chloro, fluoro or iodo, trifluoromethyl, methoxy, ethoxy, amino, nitro, carboxy, cyano or, when X and Y are taken together in the $2,2^1$-position, $(CH_2)_p$ in which P is a positive integer from 0–3, sulfur or oxygen. It will be recognized that the presence of substituents on the aryl rings have not to date been found to affect the in vitro activity positively, so that from the standpoint of chemical cost, the unsubstituted compounds appear most advantageous. However, with feed additives metabolic and toxicological considerations are also important.

The compounds of Formulas I and II in which there are no ring substituents are especially useful; for example, the diphenyliodonium salts.

The above-noted compounds are the most useful of the iodine (III) compounds having two carbon-iodine bonds because of their good stability and ease of preparation. Oxidation products such as the iodoso or iodoxy derivatives have been found active but are less useful because of stability or difficulty of preparation.

The methods of this invention for inhibiting microbial deamination in the rumen comprise administering orally to a ruminant animal a quantity of one or more of the active ingredients of Formulas I or II described above which is nontoxic to the animal, and does not inhibit the overall fermentation in the rumen or decrease feed intake, but which selectively inhibits the deaminative fermentation in the rumen.

We have found that the active quantities of the diaryliodonium salt are unexpectedly low for the large volume of the rumen. By this we mean the ingredients are selectively active at very low amounts. Exemplary ranges of active ingredient base on diphenyliodonium nitrate, iodide, bromide or chloride are between about 1 g. –1 Kg. per ton of whole or supplemented feed, preferably between about 20–200 g. per ton of feed.

Other active ingredients may be used in this range or similar ranges depending on their activity relative to the diphenyliodonium halides.

The compositions of this invention comprise an active ingredient of Formulas I or II above plus a veterinary or feed carrier. The active ingredient is present in quantities sufficient to accomplish the purposes of this invention i.e. to inhibit significantly the deamination of the amino acid constituents of the rumen contents by rumen microbes but not to have a significant adverse effect on the overall fermentation in the rumen. Usually, the ingredient is dispersed throughout the carrier uniformly. Examples of such carriers are soybean meal, corn oil, ground corn, barley, wheat, mineral mixtures such as vermiculite, diatomaceous earth, pectin, corn gluten meal, corn distillers solubles, soyflour, ensilage or various chopped hay or grain products familiar to those skilled in this art. The composition can be either a complete feed product or a premix compositon. The latter contain a measured unit amount of the active ingredient in concentrated form, which is mixed with the whole diet of the ruminant by the mixer or grower or with a secondary feed product. Usually the feed compositions of this invention are fed ad libitum to the cattle or sheep in field, barn or fattening pen.

The quantities will be at the rates mentioned for the methods of this invention. Most preferred are from about 1 g.–1 kg. per ton (0.0005 g.–5 g./lb.) of whole feed, especially from about 20–200 g./ton (0.01 g.–0.10 g./lb.). An average sheep will eat 3–4 lbs. of feed daily. An average feed-lot steer, about 20–25 lbs. Therefore an individual ruminant will ingest about 0.00150–12.5 g., preferably about 0.03–2.5 g. of active ingredient (based on diphenyliodonium chloride) per day. Sheep will ingest about 0.0015–2.0 g./day preferably 0.03–0.4 g./day. Cattle will ingest about 0.010–12.5 g./day preferably 0.20–2.5 g./day.

The animal feeds may also include roughages such as cellulose, hay, straw, silages, corn stalks cotton seed hulls, oats, barley and cereal brans; natural oils such as animal fats, fish oils, safflower oil, peanut oil and cottonseed oil; antioxidants, minerals, vitamins, antibiotics such as virginiamycin or tetracycline, antheliminitcs such as oxibendazole, parbendazole or thiabendazole, methanogenesis inhibitors such as amicloral; and other appropriate medicaments or additives known to the art.

Examples of typical prepared animal feed are as follows:

EXAMPLE 1

| Ingredient | Weight per cent |
| --- | --- |
| Mixed hay | 40.0 |
| Ground yellow corn | 45.0 |
| Soybean oil meal | 7.0 |
| Cane molasses | 7.0 |
| Dicalcium phosphate | 0.5 |
| Trace minerals salt | .5 |
| Vitamin A | 300 I.U./lb. |
| Vitamin D | 150 I.U./lb. |
| Diphenyliodonium chloride | 250 g./ton of feed |

EXAMPLE 2

An example of a suitable premix is as follows:

| Diphenyliodonium iodide | 1 lb. |
| --- | --- |
| Vermiculite | to 10 lbs. |

EXAMPLE 3

In the field the active ingredients may be administered by means of salt or molasses blocks. A typical block may be prepared using the following conditions:

| Ingredients | Weight per cent |
|---|---|
| Dried cane molasses | 44.54 |
| Ground soybean hulls | 24.90 |
| Diphenyliodonium bromide | 5.00 |
| Granulated salt | 21.59 |
| Trace minerals and vitamins | 0.20 |
| Stabilized animal fat | 1.11 |
| Moisture | 2.66 |

EXAMPLE 4 - Cattle Diet

| Ingredients | Weight per cent |
|---|---|
| Ground shelled corn | 65.85 |
| Mixed ground hay | 20.00 |
| Dried molasses | 6.00 |
| Soybean meal | 6.00 |
| Diphenyliodonium bromide | 100 g./ton feed |
| Urea | .55 |
| Trace mineral salt | .50 |
| Dicalcium phosphate | .40 |
| Ground limestone | .70 |
| Vitamin A (30,000 units/gm.) | 66.7 gm./ton |
| Vitamin $D_2$ (16,000,000 units/lb.) | 7.1 gm./ton |

The method of this invention therefore generally comprises allowing the cattle or sheep to graze or be fed ad libitum on the supplemented rations or to be fed on a regular schedule.

Amounts of high protein containing feed constituents or essential amino acids may also be added to the whole feed or to a special feed carrier and feed with the active ingredients. Exemplary of such sources of supplemental amino acids are casein, oil seed meals such as soybean meal, linseed meal, cottonseed meal, peanute meal, rapeseed meal, fish meal, alfalfa meal, corn gluten meal, corn gluten feed, chopped alfalfa casein, or the amino acids themselves such as cysteine, methionine, lysine, threonine, isoleucine, arginine, valine, histidine, phenylalanine leucine and tryptophane.

The amino acid supplement may also be in coated or other form as desired; however, this is not necessary if enough active ingredient is present to decrease deamination significantly.

Generally, the amounts of such supplemental amino acids may be within limits known to the art; for example, from about 1–10 g. of methionine per lamb per day to 5–25 g. per steer or heifer per day. Methionine has been demonstrated to be particularly useful in increasing the quality of wool in sheep but amino acids generally are important in the nutrition of ruminants generally, especially in cattle and sheep for a good growth and a high grade of meat. Generally it is desirable to supplement the food with large excess of natural feed constituents known to be rich in protein material such as those listed above. These are relatively inexpensive.

As noted above, the compounds of this invention are well known or are prepared by chemical reactions well known to the art. Particular reference may be had to D. F. Banks, Chemical Reviews 66 243–264 (1966). The various salts and methods of interchange of various anions, are described by this reference page 248..

Examples of specific iodonium salts useful in this invention are:

diphenyliodonium chloride, bromide, iodide, hydroxide, nitrate, tetrafluoroborate, perchlorate, benzenesulfonate, tetraphenylborate, sulfate, bisulfate 2,2' — ditolyliodonium chloride
4,4' — ditolyliodonium chloride, bromide, iodide
2,2',4,4',6,6' — hexamethyldiphenyliodonium chloride, bromide, iodide
4,4' — di-t-butyldiphenyliodonium chloride, bromide, iodide
4,4' — dicyclohexyldiphenyliodonium bromide, iodide bis(1,2,3,4-tetrahydro-5-naphthyl)iodonium chloride
4,4' — diodecyl diphenyliodonium bromide, iodide
1,1' — dinaphthyliodonium bromide; iodide
2,2' — dinaphthyliodonium perchlorate; iodide
4,4' — difluorodiphenyliodonium chloride; iodide
4,4' — dichlorodiphenyliodonium chloride, bromide hydroxide, bisulfate
3,3', 4,4' — tetrachlorodiphenyliodonium chloride
2,2', 4,4' — tetrachlorodiphenyliodonium sulfate, hydroxide
2,2', 4,4', 6,6' — hexachlorodiphenyliodonium hydroxide
4,4' — dibromodiphenyliodonium chloride, bisulfate
4,4' — diiododiphenyliodonium bromide
4,4' — dihydroxydiphenyliodonium
2,2' — dimethoxydiphenyliodonium bromide, bisulfate
4,4' — dimethoxydiphenyliodonium bromide, iodide, acetate, trifluoroacetate
4,4' — diacetoxydiphenyliodonium chloride
4,4' — diaminodiphenyliodonium iodide
4,4' — diacetamidodiphenyliodonium bromide, iodide
3,3' — dinitrodiphenyliodonium chloride, bromide, bisulfate
3,3' — dicarboxydiphenyliodonium iodide
4,4' — bis(ethanesulfonyl)diphenyliodonium hydroxide
4,4' — bis(succinimido)diphenyliodonium chloride
4,4' — bis(diphenyliodonium)dibromide, diiodide
2,2' — difuryliodonium iodide
2,2' — dithienyliodonium chloride, bromide, iodide, trifluoroacetate
phenyl p-tolyliodonium bromide
2,4,6-trimethyldiphenyliodonium bromide
4-cyclohexyl-3'-chlorodiphenyliodonium chloride
4-cyclohexyl-4'-bromodiphenyliodonium chloride
phenyl 2-thienyliodonium chloride, bromide, iodide, trifluoroacetate
2-thienyl O-tolyl iodonium bromide
mesityl 2-thienyl iodonium bromide
2,3,5,6-tetramethylphenyl 2-thienyl iodonium bromide
1-naphthyl phenyliodonium bromide
4-fluorodiphenyliodonium bromide
4-chlorodiphenyliodonium bromide
2,4-dichlorodiphenyliodonium hydroxide
3-bromodiphenyliodonium bromide
2,5-dibromodiphenyliodonium hydroxide
3-iododiphenyliodonium hydroxide
4-hydroxydiphenyliodonium bromide
2-methoxydiphenyliodonium bromide
3-methoxydiphenyliodonium iodide
4-methoxydiphenyliodonium bromide, iodide, trifluoroacetate
4-benzyloxydiphenyliodonium iodide
4-phenoxydiphenyliodonium iodide
4-aminodiphenyliodonium chloride, iodide, nitrate
4-acetamidodiphenyliodonium bromide, iodide, nitrate 3-nitrodiphenyliodonium bromide, iodide
3-carboxydiphenyliodonium iodide
4-methoxycarbonyldiphenyliodonium iodide
4-ethoxycarbonyldiphenyliodonium bromide, iodide
3-phenoxycarbonyldiphenyliodonium iodide
4-(2-carboxyethyl)diphenyliodonium iodide
3-methyl-4'-methoxydiphenyliodonium iodide
3-t-butyl-4'-methoxydiphenyliodonium iodide
3,5-diisopropyl-4'-methoxydiphenyliodonium iodide
3-cyclohexyl-4'-methoxydiphenyliodonium iodide
2-carboxy-4'-methyldiphenyliodonium bromide
2-cyano-4'-methyldiphenyliodonium bromide
2-hydroxy-5-nitrodiphenyliodonium acetate
4-amino-3'-nitrodiphenyliodonium nitrate
4-amino-4'-nitrodiphenyliodonium iodide
4-acetamido-3'-nitrodiphenyliodonium iodide
4-methoxy-4'-nitrodiphenyliodonium bromide, tosylate
3,5-dinitrodiphenyliodonium bromide
mesityl 3-pyridyliodonium perchlorate
4,5-phenanthroline iodonium bisulfate
O-carboxyphenyl phenyliodonium inner salt
Dibenz(be)(1,4) oxidonium chloride
Bis (2-chlorodibenziodolium)sulfate
2-chlorodibenziodolium chloride
2,2'-methylenediphenyliodonium chloride
2,2'-ethylenediphenyliodonium iodide
2,2'-trimethylenediphenyliodonium bromide An example of the preparation of a representative active ingredient follows:

EXAMPLE 1

To 19.1 g. of iodyl sulfate (prepared according to F. M. Beringer, *J. Am. Chem. Soc.*, 81, 342 (1959)) in 33 ml. of sulfuric acid and 19.8 ml of acetic anhydride (carefully mixed) is added 26.4 ml. of benzene dropwise at 0°C. The resulting mixture, after stirring over night at room temperature is quenched in 260 ml. of ice water, extracted with ether (discarded) and the residual aqueous phase is charcoaled and treated with an aqueous solution of 13.2 g. of sodium bromide to give 22 g. of diphenyliodonium bromide.

Anal. — Calc'd for $C_{12}H_{10}Br$ = C, 39.92; H ; 2.79. Found = C, 39.94; H, 2.87.

EXAMPLE 2

To a stirred solution of 15.6 g. potassium iodate, 27.2 ml. of p-xylene in 70 ml. of acetic acid and 31 ml. of acetic anhydride is added a solution of 15.6 ml. concentrated sulfuric acid and 23.3 ml. of acetic acid slowly while maintaining the temperature at 2°C. The resulting mixture is then stirred for a further 3 hours at 2°C and warmed up to room temperature. It is then worked up as in Example 1 to give 6.3 g. of 2,2',5,5' — tetramethyldiphenyliodonium bromide.

Anal. — Calc'd for $C_{16}H_{18}BrI$ = C, 46.07; H, 4.35. Found = C, 46.00; H, 4.37.

Examples of related iodo compounds which may be submitted to the screening methods outlined hereafter described to ascertain suitability as active ingredients are:

iodosobenzene
iodoxybenzene
phenyl iodosodiacetate
2,3,5,6-tetramethyliodosodiacetate
O-iodosobenzoic acid
O-iodoxybenzoic acid
1,4-dichlororodoxolin-3-one
iodosobenzene succinate
1-methoxy-1,2-benziodoxolin-3-one
1-acetoxy-1,2-benziodoxolin-3-one
iodoxobenzene dilactone.

Compounds are screened in vitro for activity by the following assay procedure:

Undiluted rumen fluid (50 ml.), or rumen fluid (25 ml.) plus phosphate buffer (25 ml.) are incubated in flasks (125 ml. Erlenmeyer) at 38°C. under $CO_2$ for 5 or 6 hours. Starch (20 mg. per ml.), urea (0.5 mg. per ml.) and a mixture of 10 essential amino acids (threonine, valine, methionine, isoleucine, leucine, phenylalanine, tryptophan, lysine, histidine and arginine, 2.0 micromoles of each per ml.) are added as substrates for fermentation. Chemical inhibitors to be tested are added to the treated flasks at a total concentration of 50 ppm for initial screening. Water insoluble compounds are added dissolved in a small amount of ethanol. An equivalent amount of ethanol has no effect on deamination.

Total amino acids are assayed prior to and at the end of the fermentation by the method of Borchers [*Anal. Chem.* 31 (7): 1179] and percent inhibition of deamination in the treated flasks calculated relative to control flasks without added chemical inhibitor. Individual amino acids are assayed on a Technicon amino acid analyzer.

Apparent inhibition of deamination in excess of 100% may be observed because of the liberation of additional amino acids during the incubation of proteinaceous materials contained in rumen fluid by proteolysis. If deamination of amino acids is inhibited, additional amino acids may accumulate.

$$\% \text{ Inhibition of Deamination} = \frac{(\% \text{ Deamination in Controls}) - (\% \text{ Deamination in Treated})}{\% \text{ Deamination in Controls}} \times 100$$

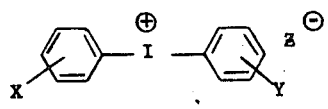

% Inhibition of Deamination (MDI) at PPM

| X | Y | Z | 50 | 25 | 10 | 5 | 2.5 | 1 |
|---|---|---|----|----|----|---|-----|---|
| H | H | I | | | | 48 | | |
| H | H | Br | | 249 | 177 | 121,84 | 80 | |
| H | H | Cl | 223 330 | 518 | 139 | 87 | | 49,36 |
| H | H | NO$_3$ | | | 319 | 162 | 99 | |
| 4-Cl | 4-Cl | Cl | 156 228 | 125 | 73 | 35 | | |
| 4-OAc | 4-OAc | Br | 154 | | | | | |
| 4-NH$_2$ | H | Br | 152 | 152 | 159 | 66 | | |
| 4-NHAc | H | Br | 123 | 145 | 37 | 16 | | |
| 2-CH$_3$ | 2-CH$_3$ | I | 212 | 94 | 60 | 41 | | |
| 3-CH$_3$ | 3-CH$_3$ | I | 97 | 85 | 76 | 35 | | |
| 4-CH$_3$ | 4-CH$_3$ | I | 292 | 205 | 138 | 76 | 57 | |
| 2,4,6-(CH$_3$)$_3$ | 2,4,6-(CH$_3$)$_3$ | I | 147 | | 82 | 61 | | |
| 2,4,6-(CH$_3$)$_3$ | 2-CO$_2^\ominus$ | | 101 | 113 | 83 | 67 | | |
| 3-CH$_3$ | 3-CH$_3$ | F | 255 | | | | | |
| 4-F | 4-F | Br | 268 | 146 | 107 | 69 | | |
| 2-CO$_2^\ominus$ | H | | 37 | | | | | |
| 4-N(succinimido) | 4-N(succinimido) | Cl | 10 | | | | | |
| 4-CH(CH$_3$)$_2$ | 4-CH(CH$_3$)$_2$ | Br | 267 | 133 | 50 | 13 | | |
| 2,5-(CH$_3$)$_2$ | 2,5-(CH$_3$)$_2$ | Br | 269 | 115 | 71 | 58 | | |

MDI% Inhibition at PPM

| Other Compounds | 50 | 25 | 10 | 5 | 2.5 | 1 |
|---|---|---|---|---|---|---|
| (2-thienyl)$_2$I$^+$ I$^-$ | 72 | | | | | |
| dibenzofuran-iodonium I$^-$ | 73 | 67 | | | | |
| dibenzyl-iodonium I$^-$ | 86 | 8 | | | | |
| C$_6$H$_5$IO | 132 | 127(83) | 56 | 32 | 21 | |
| (3-CH$_3$-C$_6$H$_4$)$_2$I(O) F$^-$ | 255 | 138 | 96 | | | |

Four types of in vivo experiments are conducted to evaluate the efficacy of aryliodonium compounds in depressing rumen microbial deamination of amino acids and promoting increased rates of animal productivity.

1. Single dose experiments. Rumen fistulated cattle were fed a pelleted 60% concentrate diet but were not currently being fed either free amino acid supplements or aryliodonium compounds. Thus the rumen microbes were not adapted to receiving either amino acid or aryliodonium compounds. To conduct the test, animals received ruminal doses of free amino acids (threonine, 4.5 g.; valine, 4.5 g.; methionine, 6.0 g.; isoleucine, 5.0 g.; leucine, 5.0 g.; phenylalanine, 6.5 g.; lysine, 7.5 g.; histidine, 8.5 g.), 50 g. of a soluble rumen marker, polyethylene glycol (PEG), and aryliodonium compound under investigation. Activity was assessed as changes, with respect to time, in the ratio of amino acids to PEG. Inhibition of reumen microbial deamination results in a greater quantity (micromoles) of amino acid per unit (gram) of PEG. Thus, the size of the rumen free amino acid pool is increased.

Using the above protocol, a series of experiments were conducted to evaluate the efficacy of several aryliodonium compounds for increasing the magnitude of the rumen free amino acid pool by inhibiting rumen microbial deamination. Only total amino acid concentrations, assayed according to the procedure of Borchers (Anal. Chem. 31(7):1179), were determined.

Effect of aryliodonium compounds on the concentration of total amino acids in the rumen of cattle

| Chemical | Dose (g.) | Time (hr.) 3 | 6 |
|---|---|---|---|
| | | μmoles per gram PEG | |
| Control | 0 | 2504 | 310 |
| Diphenyliodonium Chloride | | | |
| | .6 | 5990 | 6160 |
| | .3 | 5460 | 4460 |
| | .25 | 5060 | 3120 |
| | .10 | 5187 | 3465 |
| Diphenyliodonium bromide | | | |
| | .25 | 4770 | 3500 |
| | .10 | 4275 | 1464 |
| Diphenyliodonium nitrate | | | |
| | .25 | 6510 | 5230 |
| | .10 | 5140 | 2090 |
| Diphenyliodonium iodide | | | |
| | .25 | 4890 | 2380 |
| | .10 | 3640 | 1180 |
| p-Aminophenyl phenyliodonium bromide | | | |
| | .25 | 4631 | 1653 |
| Di-p tolyliodonium iodide | | | |
| | .25 | 5670 | 2050 |

Utilizing the single dose procedure, the effect of two levels of diphenyliodonium chloride upon rumen concentrations of individual essential amino acids, as assayed with a Technicon analyzer, were determined. Effect of diphenyliodonium chloride upon rumen concentrations of essential amino acids.

both of the single dose experiments demonstrated that rumen microbial deamination of amino acids is a rapid biochemical process. In the absence of added aryliodonium compounds, only minute quantities of amino acids are present in the rumen 6 hours after adminstration. Adding compounds described in this invention, especially diphenyliodonium chloride, bromide, nitrate and iodide resulted in a dramatic increase in the quantity of free amino acids in the rumen. The digestion mass, as it passes out of the rumen to the omasum, abomasum and finally to the small intestine, will contain these increased concentrations of amino acids which are then available for absorption from the small intestine.

2. Feeding experiments. Rumen fistulated cattle were maintained on a pelleted 60% concentrate diet plus a corn meal carrier supplement of amino acids (either free amino acids in quantities previously described for single dose experiments or 250 g. soy protein) and the microbial deaminase inhibitor, diphenyliodonium chloride. The feeding regimen was offered at least 7 days prior to conducting experiments in order to adapt animals to dietary inclusions. To conduct the test a precise starting time was obtained by administering through the rumen cannulae the above-mentioned corn meal carrier supplement plus 50 g. PEG. As with the single dose experiments, activity was assessed as changes, with respect to time, in the ratio of amino acids to PEG. Both total (Borchers, Anal. Chem. 31(7): 1179) and individual amino acids (Technicon analyzer) were determined. In the first experiment presented below, amino acids were supplied by free amino acids. Soy protein was the source of amino acids in the second study. In the second study, rumen samples were also assayed for volatile fatty acids in order to assess the effect of diphenyliodonium chloride upon the pattern of resulting rumen fermentation. Amino acids in rumen of deaminase inhibitor adapted cattle three and six hours after ruminal administration of diphenyliodonium chloride and amino acids.

Amino acids in rumen of diaminase inhibitor adapted cattle three and six hours after ruminal administration of diphenyliodonium chloride and soy protein.

| Time | 3 hr | | | 6 hr | | |
|---|---|---|---|---|---|---|
| Diphenyliodonium chloride (g.) | 0 | 0.3 | 0.6 | 0 | 0.3 | 0.6 |
| | | | μmoles per gram polyethylene glycol | | | |
| Threonine | 46 | 298 | 226 | 13 | 35 | 23 |
| Valine | 316 | 570 | 577 | 29 | 583 | 627 |
| Methionine | 394 | 511 | 518 | 83 | 445 | 443 |
| Isoleucine | 191 | 487 | 538 | 9 | 347 | 438 |
| Leucine | 193 | 521 | 551 | 13 | 367 | 468 |
| Phenylalanine | 30 | 144 | 490 | 0 | 318 | 390 |
| Lysine | 253 | 574 | 554 | 115 | 536 | 321 |
| Histidine | 325 | 391 | 374 | 77 | 315 | 192 |
| Ammonia | 710 | 183 | 427 | 880 | 376 | 523 |

| Time | 3 hr | | | | 6 hr | | | |
|---|---|---|---|---|---|---|---|---|
| Dose (g.) | 0 | .25 | .50 | 1.0 | 0 | .25 | .50 | 1.0 |
| | | | μmoles per gram polyethylene glycol | | | | | |
| Threonine" | 29 | 117 | 351 | 429 | 0 | 71 | 141 | 238 |
| Valine" | 368 | 821 | 686 | 647 | 0 | 629 | 755 | 595 |
| Methionine" | 304 | 609 | 647 | 717 | 0 | 537 | 652 | 709 |

―Continued

| Time | 3 hr. | | | | 6 hr. | | | |
|---|---|---|---|---|---|---|---|---|
| Dose (g.) | 0 | .25 | .50 | 1.0 | 0 | .25 | .50 | 1.0 |
| Isoleucine[a] | 213 | 673 | 596 | 548 | 0 | 413 | 549 | 467 |
| Leucine[a] | 214 | 665 | 553 | 567 | 0 | 280 | 501 | 517 |
| Phenyl-alanine[a] | 245 | 725 | 605 | 604 | 0 | 587 | 622 | 576 |
| Lysine[a] | 174 | 636 | 109 | 573 | 0 | 506 | 30 | 239 |
| Histidine[a] | 181 | 591 | 460 | 519 | 28 | 390 | 307 | 448 |
| TOTAL[b] | 1570 | 5840 | 6120 | 6060 | 90 | 3400 | 4470 | 5340 |
| Ammonia[a] | 1783 | 403 | 242 | 253 | 1321 | 538 | 344 | 397 |

[a]Assayed with Technicon analyzer.
[b]Assayed according to Borchers [Anal. Chem. 31 (7): 1179].

| Time (hr.) | 3 | | | | 6 | | | |
|---|---|---|---|---|---|---|---|---|
| Amount (g.) | 0 | .25 | .50 | 1.0 | 0 | .25 | .50 | 1.0 |
| | μmoles per gram polyethylene glycol | | | | | | | |
| Aspartate[a] | 47 | 26 | 48 | 63 | 42 | 23 | 29 | 54 |
| Threonine[a] | 5 | 5 | 6 | 22 | 3 | 16 | 9 | 33 |
| Serine[a] | 8 | 7 | 4 | 6 | 10 | 3 | 5 | 10 |
| Glutamate[a] | 98 | 110 | 414 | 232 | 120 | 116 | 209 | 292 |
| Glycine[a] | 35 | 111 | 106 | 77 | 56 | 57 | 71 | 205 |
| Alanine[a] | 10 | 342 | 371 | 354 | 23 | 259 | 433 | 653 |
| Valine[a] | 0 | 93 | 107 | 35 | 0 | 59 | 191 | 75 |
| Methionine[a] | 0 | 6 | 24 | 0 | 0 | 14 | 4 | 0 |
| Isoleucine[a] | 0 | 33 | 36 | 7 | 0 | 57 | 61 | 14 |
| Leucine[a] | 0 | 63 | 55 | 13 | 0 | 97 | 102 | 33 |
| Tyrosine[a] | 0 | 27 | 30 | 5 | 0 | 0 | 39 | 8 |
| Phenyl-alanine[a] | 0 | 25 | 35 | 2 | 0 | 12 | 50 | 9 |
| Ornithine[a] | 0 | 46 | 18 | 44 | 0 | 138 | 80 | 60 |
| Lysine[a] | 9 | 40 | 17 | 4 | 24 | 37 | 3 | 6 |
| Histidine[a] | 0 | 4 | 6 | 8 | 0 | 0 | 0 | 0 |
| TOTAL[b] | 0 | 1480 | 1860 | 1730 | 0 | 790 | 1320 | 1460 |
| Ammonia[a] | 1050 | 346 | 292 | 280 | 1165 | 430 | 370 | 524 |

[a]Assayed with Technicon analyzer
[b]Assayed according to Borchers (Anal. Chem. 31(7):1179)

Percentage distributon of rumen volatile fatty acids in cattle adapted to diphenyliodonium chloride.

| | Amount (g.) | | | |
|---|---|---|---|---|
| Fatty acid | 0 | .25 | .50 | 1.0 |
| | molar percent | | | |
| Acetate[a] | 60.2 | 56.4 | 48.0 | 51.8 |
| Propionate[a] | 19.8 | 24.7 | 44.8 | 37.4 |
| Butyrate[a] | 16.8 | 16.3 | 12.0 | 8.8 |

[a]Average for samples obtained prior to and 3 and 6 hr. after ruminal administration of aryliodonium compound.

The feeding studies conducted demonstrate that whether amino acids are supplied in the free form or as soy protein, ruminal deamination is rapid and the rumen amino acid pool is small or non-existent unless a microbial deaminase inhibitor is incorporated into the diet. In both the amino acid and soy protein feeding experiments, diphenyliodonium chloride was effective in increasing the rumen concentration of amino acids. Greater rumen amino acid concentrations were noted in animals fed amino acids versus soy protein, but this is to be expected because in the latter case rumen proteolysis governs the release rate of amino acids from soy protein.

Increases in rumen amino acid concentrations obtained in the feeding experiments versus the previously discussed single dose experiments demonstrate that continued administration of aryliodonium compounds does not decrease their effectiveness.

Diphenyliodonium chloride may also produce desirable shifts in the pattern of VFA production as indicated by decreases in molar percentages of acetate and butyrate and increases in the proportion of propionate.

3. Plasma amino acid experiments. Plasma amino acid concentrations increase when the quantity of amino acids absorbed from the small intestine exceeds the quantity needed for tissue protein synthesis. Cattle were maintained on the regimen previously described for single dose experiments. Jugular vein blood samples were obtained prior to, and 3 and 6 hours after ruminal administration of amino acids and diphenyliodonium chloride. Plasma was obtained from the blood samples, and following deproteinization; amno acids were assayed with a technicon analyzer. Concentrations of plasma essential amino acids in cattle adapted to dietary amino acids and diphenyliodonium chloride.

| Amino acid | Diphenyliodonium chloride (g/day) | | | |
|---|---|---|---|---|
| | 0 | .50 | 1.0 | 2.0 |
| | μmoles/100 ml | | | |
| Threonine | 7.90 | 11.25[a] | 9.19[b] | 7.59 |
| Valine | 13.99 | 19.72[b] | 20.36[b] | 26.78[a] |
| Methionine | 4.90 | 4.98 | 6.06[b] | 5.51 |
| Isoleucine | 8.70 | 8.88 | 11.37[a] | 10.72[a] |
| Leucine | 15.93 | 17.48 | 17.90[b] | 22.98[a] |
| Phenylalanine | 4.57 | 4.89 | 7.33[a] | 3.80 |
| Histidine | 7.01 | 6.02 | 8.61[b] | 8.49[b] |
| Lysine | 11.89 | 13.44 | 17.86[a] | 21.00 |

[a]Significantly different from 0g/day at P>.05.
[b]Significantly different from 0g/day at P>.10.

Significant increases in plasma concentrations of amino acids administered into the rumen, in conjunction with diphenyliodonium chloride, demonstrates that aryliodonium compounds prevent ruminal destruction of amino acids, and a greater quantity of amino acids are subsequently absorbed from the gastrointestinal tract.

4. Nitrogen balance study. Finally, the efficacy of aryliodonium compounds in increasing ruminant animal productivity by preventing ruminal deamination of amino acids was confirmed in a nitrogen utilization study using the following protocol:

350–400 kg fattening cattle were fed on 80% concentrate diet (10.5% protein). Free amino acids were infused into the abmosum (positive control) or added to the diet without (negative control) or in conjunction with diphenyliodonium chloride. Animals were subjected to each of the three treatments for 14 days in a latin square design; the first seven days adapted animals to treatments whereas excreta was collected during the second seven-day period. Feed and excreta were assayed for nitrogen and nitrogen balances are then calculated.

Nitrogen utilization by fattening cattle.

| Route of amino acid administration | Treatment | | |
|---|---|---|---|
| | 1 | 2 | 3 |
| | abomasum | diet | diet |
| Diphenyliodonium chloride (% of diet) | 0 | .015 | 0 |
| Ration-N(g/day) | 105.9 | 105.9 | 105.9 |
| Dietary amino acid-N(g/day) | 0 | 14.3 | 16.1 |
| Infused amino acid-N(g/day) | 16.9 | 0 | 0 |
| Total-N supplied (g/day) | 122.8 | 120.3 | 122.0 |
| Fecal-N(g/day) | 51.2 | 43.7 | 48.6 |
| Urine-N(g/day) | 48.1$^a$ | 49.5$^a$ | 53.1 |
| Retained-N(g/day) | 23.4 | 27.1$^a$ | 20.4 |
| Retained-N(% of absorbed) | 32.8$^b$ | 35.4$^a$ | 27.7 |
| Ration dry matter digestibility(%) | 69.6 | 70.5 | 72.5 |

$^a$Mean values are different from treatment 3 at P>.05.
$^b$Mean values are different from treatment 3 at P>.10.

By comparing treatments 1 vs. 3, it is apparent that cattle receiving abomasal supplements of amino acids excreted less nitrogen in urine and consequently retained more nitrogen than animals offered free amino acids in their diet without the benefit of a microbial deaminase inhibitor. We previously reported (Federation Proceedings 31:681) that abomasal administration of casein, casein hydrolysate or a mixture of ten essential amino acids would increase the quantity of nitrogen retained by 250 to 350 kg cattle. Because administration of amino acids directly into the abomasum is simply a convenient experimental technique of providing ruminants with amino acids at a point posterior to the rumen but anterior to the small intestine, these results demonstrate that prevention of rumen microbial deamination of amino acids will improve animal preformance.

Comparing nitrogen balance data obtained with treatments 2 vs. 3, it is obvious that the inhibition of rumen microbial deamination provided by diphenyliodonium salts produced an improvement in utilization of dietary nitrogen. Cattle offered dietary amino acids plus diphenyliodonium chloride excreted less fecal and urine nitrogen and therefore retained more nitrogen than animals fed amino acids without the aryliodonium compound. Lack of significant changes in ration dry matter digestibility indicated that diphenyliodonium chloride had no apparent detrimental influence overall on rumen metabolism.

Nitrogen retention is theoretically a direct estimate of average daily gain. Increases in average daily gain of feed-lot steers should therefore be obtained when aryliodonium compounds are included in ruminant rations. Feed efficiency should also be increased, but this response cannot be evaluated until production studies are conducted. We obtained the nitrogen retention response by feeding an aryliodonium compound to fattening steers. Because the greatest need for supplemental amino acids is when the animal requirement is for a high level of amino acids in relation to energy requirement and supply, greater gain responses can be anticipated in light weight, rapidly growing ruminants. Mature sheep used for wool production and lactating dairy cattle should also respond to amino acid by-pass provided by aryliodonium compounds.

While as noted above ring substituents have not yet been found to have profound effects on MDI activity, substituents in certain positions of the phenyl rings of the active ingredients of Formulas I and II have been found to give a favorable metabolism pattern in animals. For example the metabolism of a diphenyliodonium ion may give, depending on the species, iodobenzene, iodocatechols or iodomercapturic acids. Lower alkyl diphenyliodonium ions on the other hand give rise to more acceptable metabolites, i.e. iodobenzoic or hippuric acids.

For this reason the p-methyl and p-ethyl diphenyl iodonium salts of Formulas I and II are preferred active ingredients in the composition and methods of this invention. More specifically the preferred compounds are

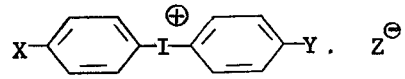

in which Z is an optional anion as described above and X and Y are either methyl or ethyl. Most advantageous the 4,4'-or p,p-diemthyldiphenyliodonium iodide, bromide or especially chloride. These compounds are alternatively named 4,4'-ditolyliodonium salts.

It will be apparent that other similarly substituted or more highly substituted compounds may be equivalent to those described here.

4,4'-Dimethyldiphenyliodonium Chloride

To a stirred solution of 900 ml. of acetic acid, 475 ml. (1mole) of acetic anhydride and 320 ml. (3.0 mole) of toluene is added 2.4 g. (1.0 mole) of postassium iodate. The resulting mixture is cooled to 1°C. and a solution of 214 ml. of conc sulfuric acid and 585 ml. of acetic acid is added dropwise. The resulting mixture is stirred with gradual increase in temperature to ambient temperature overnight. The reaction mixture is poured into 2.8 1l. of ice water, extracted with ether and the aqueous phase, with ether removed, in vacuo, is treated with a solution of 304 g. of ammonium chloride in 980 ml. of water. After cooling the solid is filtered and recrystallized from acetonitrile to give 185.6 g. (27%) and 4,4-dimethyldiphenyliodonium chloride, m.p. 183°–184°. (reported* = 185°–186°)

*F. M. Beringer, J. Am. Chem. Soc., 81, 349 (1959).

Anal. — Calc'd for $C_{14}H_{14}ClI$ = C, 48/79; H, 4.09.
Found = C, 48.48; H, 4.14.

Observations on weight gain and feed efficiency of growing cattle fed the rumen microbial deaminase inhibitor, 4'—4'-Ditolyliodonium Chloride.

Thirty-two Hereford steers were paired according to body weight (16 pairs), fed a non-medicated ration for 2 weeks, and then one animal of each pair continued to receive the non-medicated ration whereas its mate was fed a ration containing 0.005% (50 ppm) 4'-4'-

Ditolyliodonium Chloride. For health reasons (diarrhea in non-medicated animal; pink eye in medicated mate) one pair was eliminated from the performance criteria calculations which are presented in the accompanying table. Ad libitum feed intakes were identical for the two treatment groups. Animals fed the medicated ration gained 13% more weight (0.84 vs. 0.74 kg./day) and required 11% less feed per kilogram gain (7.15 vs. 8.04 kg.).

Performance of growing stress fed 4-4'-ditolyliodonium chloride

| Parameter | Non-medicated | Medicated (50 ppm) |
|---|---|---|
| No. of Animals | 15 | 15 |
| Initial body weight (kg.) | 170 | 170 |
| Days on experiment | 59 | 59 |
| Days fed 4'-4'-ditolyliodonium chloride | 0 | 42 |
| Daily Feed intake (kg./animal) | | |
| 0–14[b] | 5.11 | 5.09 |
| 15–59[c] | 6.73 | 6.73 |
| Average daily gain (kg.) | 0.74 | 0.84[d] |
| Feed/gain | 8.04 | 7.15[d] |

[a]Complete ration composed of ground ear corn, ground alfalfa hay, molasses, a commercial beef mix supplement, soy bean meal and ammonium chloride.
[b]All animals fed non-medicated feed.
[c]One animal from each pair continued on medicated feed; paired-mate fed medicated ration.
[d]Statistically different from animals fed non-medicated feed at the 1% level of probability according to paired t-test.

The MDI for the chloride salt of the 4,4'-disubstituted species is as follows

```
4—CH₃ 4—CH₃ Cl10(3.17 mm/ml. × 10⁵)    7.5 (2.38)
              109                             75
    5.0 (1.58)        2.5 (0.79)
       67                 41
4—C₂H₅—4—C₂H₅ Cl 10(3/17 mm/ml. × 10⁵)  7.5 (2.38)
              129                             91
    5.0 (1.58)        2.5 (0.79)
       77                 34
```

What is claimed is:

1. The method of inhibiting microbial deamination of amino acids in the rumen of animals without having a significant adverse effect on the overall fermentation of the rumen comprising administering orally to ruminant animals a quantity of an active ingredient effective but nontoxic to the animal, said ingredient having the formula:

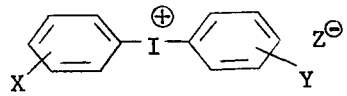

in which
Z is an anion derived from a nontoxic, pharmaceutically acceptable inorganic or organic acid; and
X and Y are respectively hydrogen, methyl, ethyl, halo, trifluoromethyl, methoxy, ethoxy, amino, acetamido, nitro, carboxy, cyano, or when both X and Y are taken together in the 2,2'-position, sulfur, oxygen or $(CH_2)_p$ in which $p$ is an integer from 0–3.

2. The method of claim 1 in which the active ingredient is a diphenyliodonium salt.

3. The method of claim 1 in which the active ingredient is a 4,4'-dimethyldiphenyliodonium salt.

4. The method of claim 2 in which the quantity of active ingredient is from about 1 g. –1 kg. per ton of feed.

5. The method of claim 3 in which the salt is a chloride bromide or iodide.

6. The method of claim 3 in which the quantity of active ingredient is from about 1 g.–1 kg. per ton of feed.

7. The method of claim 3 in which the quantity of active ingredient is from about 20–200 g. per ton of feed.

8. The method of claim 3 in which the animal is administered from about 0.1–5 g. per day.

9. The method of claim 3 in which the salt is chloride and the quantity of said active ingredient is about 0.005% (50 p.p.m.).

10. An animal feed composition effective for selective inhibition of microbial deamination in ruminant animals comprising an effective but nontoxic quantity of an active ingredient dispersed uniformly throughout an animal feed carrier, said active ingredient having the formula:

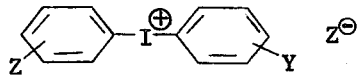

in which
Z is an anion derived from a nontoxic, pharmaceutically acceptable inorganic or organic acid; and
X and Y are respectively hydrogen, methyl, ethyl, halo, trifluoromethyl, methoxy, ethoxy, amino, acetamido, nitro, carboxy, cyano, or when both X and Y are taken together in the 2,2'-position, sulfur, oxygen or $(CH_2)_p$ in which $p$ is an integer from 0–3.

11. The composition of claim 10 in which the ingredient is a diphenyliodonium salt.

12. The composition of claim 10 in which the ingredient is a 4,4'-dimethyldiphenyliodonium salt.

13. The composition of claim 10 in which the ingredient is present in from about 1 g.–1 kg. per ton of whole feed.

14. The composition of claim 12 in which the ingredient is a chloride, bromide or iodide.

15. The composition of claim 12 in which the ingredient is present in from about 20–200 g. per ton of whole feed.

16. The composition of claim 10 in which the ingredient is 4,4'-dimethyldiphenyliodonium chloride and the quantity of said active ingredient is about 0.005% (50 p.p.m.).

17. The composition of claim 10 in which the feed carrier is further supplemented with one or more amino acids essential for the ruminant animal.

18. The composition of claim 17 in which the amino acid is methionine, lysine or threonine.

* * * * *